(12) United States Patent
Baity et al.

(10) Patent No.: US 11,724,801 B2
(45) Date of Patent: Aug. 15, 2023

(54) VTOL AIRCRAFT HAVING FIXED-WING AND ROTORCRAFT CONFIGURATIONS

(71) Applicant: Textron Systems Corporation, Hunt Valley, MD (US)

(72) Inventors: Sean Marshall Baity, Westminster, MD (US); David D. Billingsley, Seven Valleys, PA (US); Brad S. Galloway, Seven Valleys, PA (US); Richard M. Chapman, Madison, WI (US)

(73) Assignee: Textron Systems Corporation, Hunt Valley, MD (US)

( * ) Notice: Subject to any disclaimer, the term of this patent is extended or adjusted under 35 U.S.C. 154(b) by 745 days.

(21) Appl. No.: 16/178,892

(22) Filed: Nov. 2, 2018

(65) Prior Publication Data

US 2019/0135424 A1 May 9, 2019

Related U.S. Application Data

(60) Provisional application No. 62/663,415, filed on Apr. 27, 2018, provisional application No. 62/581,093, filed on Nov. 3, 2017.

(51) Int. Cl.
*B64C 29/00* (2006.01)
*B64C 39/10* (2006.01)
(Continued)

(52) U.S. Cl.
CPC .......... *B64C 29/0033* (2013.01); *B64C 39/10* (2013.01); *B64C 1/26* (2013.01); *B64C 11/44* (2013.01); *B64C 11/46* (2013.01); *B64C 39/024* (2013.01); *B64C 2039/105* (2013.01); *B64C 2201/021* (2013.01); *B64C 2201/024* (2013.01);
(Continued)

(58) Field of Classification Search
CPC ............................ B64C 29/0033; B64C 39/10
See application file for complete search history.

(56) References Cited

U.S. PATENT DOCUMENTS

| 2,054,810 A | 9/1936 | Gaba |
| 2,474,635 A | 6/1949 | Nichols |

(Continued)

FOREIGN PATENT DOCUMENTS

| CN | 103738496 | 4/2014 |
| DE | 102014000640 | 7/2015 |

(Continued)

*Primary Examiner* — Jessica B Wong
(74) *Attorney, Agent, or Firm* — BainwoodHuang

(57) ABSTRACT

An aircraft includes an airframe having a fixed-wing section and a plurality of articulated electric rotors, at least some of which are variable-position rotors having different operating configurations based on rotor position. A first operating configuration is a vertical-flight configuration in which the rotors generate primarily vertical thrust for vertical flight, and a second operating configuration is a horizontal-flight configuration in which the rotors generate primarily horizontal thrust for horizontal fixed-wing flight. Control circuitry independently controls rotor thrust and rotor orientation of the variable-position rotors to provide thrust-vectoring maneuvering. The fixed-wing section may employ removable wing panels so the aircraft can be deployed both in fixed-wing and rotorcraft configurations for different missions.

18 Claims, 20 Drawing Sheets

(51) Int. Cl.
*B64C 1/26* (2006.01)
*B64C 11/44* (2006.01)
*B64C 11/46* (2006.01)
*B64C 39/02* (2023.01)
*B64D 27/24* (2006.01)
*G05D 1/08* (2006.01)

(52) U.S. Cl.
CPC .. *B64C 2201/028* (2013.01); *B64C 2201/042* (2013.01); *B64C 2201/088* (2013.01); *B64C 2201/104* (2013.01); *B64C 2201/108* (2013.01); *B64C 2201/165* (2013.01); *B64C 2211/00* (2013.01); *B64D 27/24* (2013.01); *G05D 1/0858* (2013.01)

(56) References Cited

U.S. PATENT DOCUMENTS

| | | | |
|---|---|---|---|
| 2,664,958 A | 1/1954 | Dancik | |
| 3,089,666 A | 5/1963 | Quenzler | |
| 3,794,273 A | 2/1974 | Girard | |
| 3,868,073 A * | 2/1975 | King | B64C 39/066 244/34 A |
| 4,535,958 A * | 8/1985 | Hutchison | B64C 3/18 244/123.8 |
| 6,622,962 B1 | 9/2003 | White | |
| 8,469,306 B2 | 6/2013 | Kuhn, Jr. | |
| 8,636,241 B2 | 1/2014 | Lugg et al. | |
| 9,694,911 B2 | 7/2017 | Bevirt et al. | |
| 2003/0094537 A1 | 5/2003 | Austen-Brown | |
| 2013/0092799 A1* | 4/2013 | Tian | B64C 27/26 244/7 R |
| 2013/0206915 A1* | 8/2013 | Desaulniers | B64C 29/00 244/165 |
| 2015/0014475 A1 | 1/2015 | Taylor et al. | |
| 2016/0114887 A1 | 4/2016 | Zhou et al. | |
| 2016/0144957 A1 | 5/2016 | Claridge et al. | |
| 2018/0273170 A1 | 9/2018 | D'Sa et al. | |
| 2018/0370629 A1* | 12/2018 | Finlay | B64C 39/024 |

FOREIGN PATENT DOCUMENTS

| | | |
|---|---|---|
| JP | H01257695 A | 10/1989 |
| JP | 2003312593 A | 11/2003 |
| JP | 201332146 A | 2/2013 |
| JP | 2014528382 A | 10/2014 |
| JP | 2016501154 A | 1/2016 |
| WO | 2009095696 | 8/2009 |
| WO | 20090095696 | 8/2009 |
| WO | 20100137016 | 12/2010 |
| WO | 20130178776 | 12/2013 |
| WO | 20140045276 | 3/2014 |
| WO | 20140058351 | 4/2014 |
| WO | 20170096478 | 6/2017 |
| WO | 20180045253 | 3/2018 |

* cited by examiner

Variable Position Rear Pod
Variable Position Front Pod

Semi-Fixed Position Rear Pod
Variable Position Front Pod

Fixed Position Rear Pod
Variable Position Front Pod

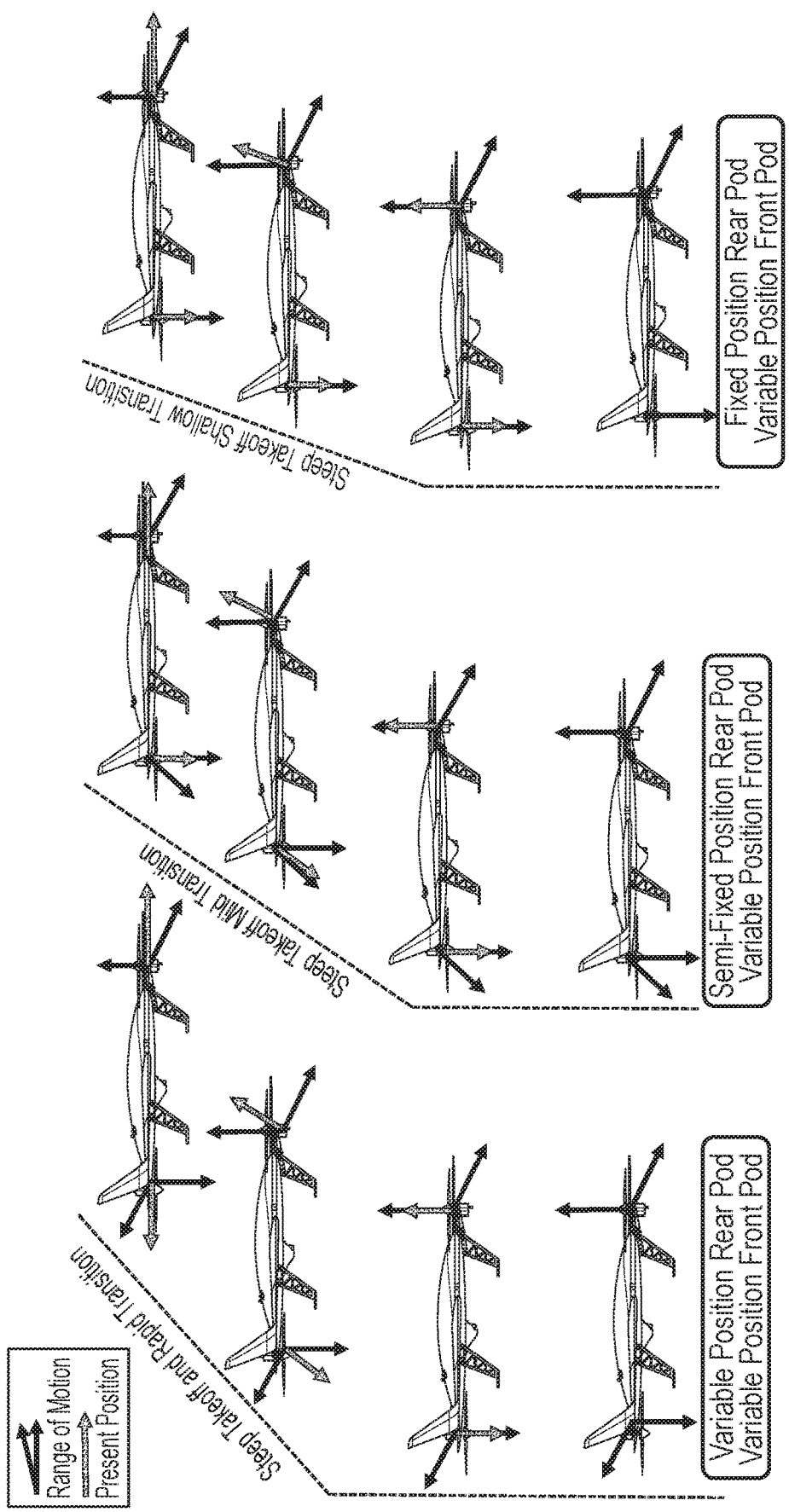

VTOL AIRCRAFT HAVING FIXED-WING AND ROTORCRAFT CONFIGURATIONS

BACKGROUND

The invention relates to aircraft systems, and in particular to aircraft having vertical take-off and landing (VTOL) capability.

Aircraft systems are known to have certain characteristics. Example systems include the following:
1) Unmanned Small Multi-Rotor Quad-Copters ("drones")
2) Unmanned Fixed-Wing Electric
3) Unmanned Internal Combustion (IC) Engine Fixed-Wing/Rotor Craft
4) Unmanned Separated Lift/Thrust Fixed wing aircraft (Hybrid-Quad) Rotor
5) Tail-Sitters
6) Manned Single Engine Fixed-Wing Aircraft
7) Manned Rotorcraft Aircraft The above systems exhibit differences across a variety of characteristics, including cost and complexity; endurance; payload capacity; launch/recovery characteristics; energy density; scalability; presence of human operator; and others.

SUMMARY

Disclosed is a configurable aircraft that can fill a functional gap between consumer "drones" and Group 2 unmanned aircraft systems (UAS). In one embodiment, the aircraft is an all-electric VTOL capable UAS that maximizes capability within a sub-25 kg (55 lb) weight class, usable in applications such as precision survey and monitoring during both linear and vertical missions with a reduced unit, operating, and life-cycle cost. Generally, the aircraft may be employed in oil and gas, security, wildfire/land management, maritime security, environmental monitoring, precision survey and mapping, precision agriculture, disaster response, insurance risk management, intelligence, surveillance, and reconnaissance, and insurance claim services, for example. In a typical embodiment the aircraft is unmanned, but in alternative embodiments it may be a manned aircraft.

In one embodiment the concept is a blended wing body fixed-wing aircraft with articulated propeller/motors (rotors) that is designed to exploit the full potential of an aircraft with a relatively small gross weight, e.g., less than 55 lbs. The aircraft need not include traditional flight control surfaces, achieving control authority primarily or exclusively through thrust vectoring. The system is designed to be modular to scale performance based on best available electrical energy solutions for encompassing storage, conversion, and regeneration. This may include thermal or chemical process based electrical power generation (i.e. onboard internal combustion engine, gas-turbine, fuel-cell) or near-field energy scavenging devices (i.e. photovoltaic cells, electromagnetic induction/capacitive/resonate coupling) or far-field power beaming (i.e. microwaves, lasers). The system may include supplementary control surfaces that provide control authority in the absence of propeller thrust to support glide or selective activation of installed thrust rotors. The system is Vertical/Take-Off and Landing (VTOL) capable. It can be utilized as a traditional multi-rotor platform or transition to fixed-wing flight for longer endurance or applications where range/coverage are required.

Below are additional specific features in at least some embodiments:
All-electric fixed-wing capability without assisted launch
Gross weight less than 25 kg (55 lbs)
Thrust vectored aerodynamic control
Simplified large-volume blended wing without need for traditional control surfaces
Independently controlled articulated vector propulsion and control thrust modules
Thrust module airfoil for unpowered glide control
Center section forming a standalone rotorcraft (e.g., quadcopter)
High speed dash/high altitude operations with motor thrust

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 29-31 are quasi-schematic depictions of differences of flight control and dynamics among the three configurations of FIGS. 26-28;

DETAILED DESCRIPTION

Figure 1:
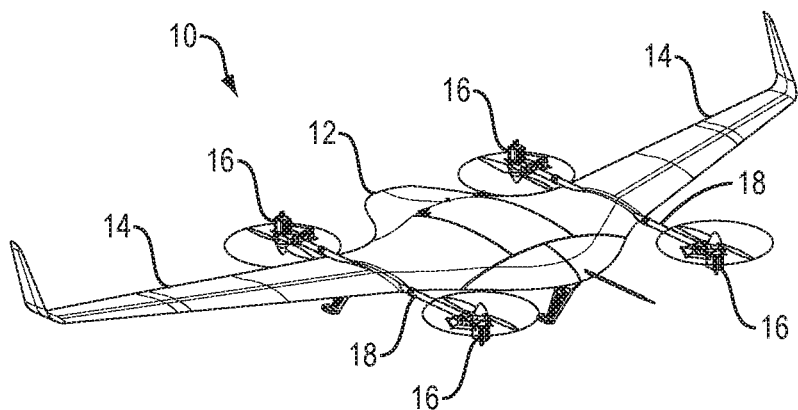
FIG. 1 is an isometric view of an aircraft.
Figure 2:
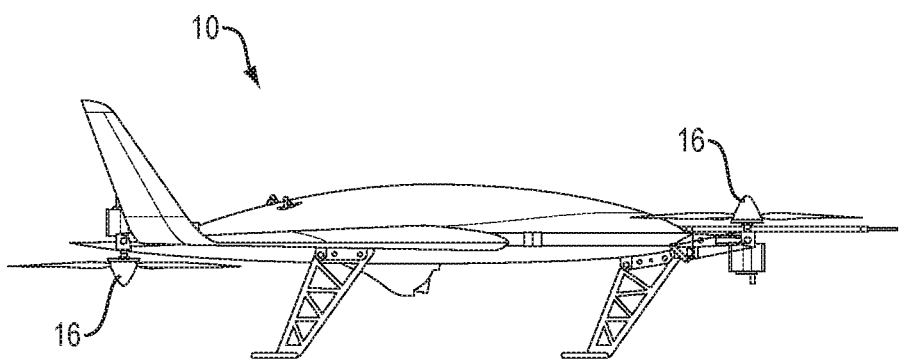
FIG. 2 is a side view of the aircraft.

FIGS. 1 and 2 show an aircraft 10 according to one embodiment of the invention. FIG. 1 is an isometric view (from top front right) and FIG. 2 is a side view.

The aircraft 10 has a central body 12 and laterally extending wing panels 14. Four motor/rotor assemblies 16 are attached at respective ends of two support booms 18, each extending longitudinally and mounted to the underside as shown. The assemblies 16 are also referred to as "rotors" and "propulsion pods" or "pods" herein. As described more below, the wing panels 14 are removable to change the operating configuration of the aircraft 10. The aircraft can be configured in two major ways: fixed wing with vertical takeoff and landing (VTOL), and VTOL quadcopter (more generally, rotorcraft), which is described more below. The central body 12 is contoured to have the shape of a flying wing, i.e., a wing-like shape capable of providing lift in a horizontal airstream. In a quad-rotor embodiment, the rotors 16 are arranged at respective corners of the central body 12. The front rotors 16 are oriented upward and the rear rotors 16 downward, and at least some of the rotors 16 are articulable or variable-position (e.g., all rotors, just forward rotors, just aft rotors). In fixed-wing operation, positional control is achieved by thrust vectoring, described more below. The aircraft 10 may be realized without conventional control surfaces such as flaps, stabilizers, etc. Omitting such control surfaces may help reduce airframe noise, which may be advantageous in certain applications. In different embodiments, a similar aircraft can be constructed with various combinations and distributions of rotor configurations and be realized with as few as two rotors. A typical arrangement includes four rotors 16 as shown; other arrangements are possible.

In the illustrated embodiment, fore/aft pairs of rotors 16 are co-linear on lines parallel to the longitudinal axis of the aircraft as shown. The opposing upward/downward rotor orientation utilizes a pusher propeller in the rear, and a tractor propeller in the front. This allows both front and rear rotors 16 to rotate 90 degrees or more and therefore provides for the retention of positive thrust through the transition between hovering or vertical flight (takeoff/landing) and forward flight. In alternative embodiments the support booms 18 may extend laterally rather than fore/aft.

The rotors 16 may incorporate integrated control surfaces as either extensions to the actuated propulsor and/or variable pitch propeller. These features can be implemented concurrently or independently to control forces imparted on the aircraft and resulting body moments. The propulsors may include variable pitch rotors for the purposes of operating with variable thrust at constant rotational speeds and/or variable-pitch propellers as shown. The rotors also may be implemented in various ways, including co-axial, counter-rotating, intermeshing rotors, ducted fans, and hub-less rotors as shown. Additionally, the tail section of the center body 12 may be articulated, tilted, morphed, to provide pitch control.

Figure 3:
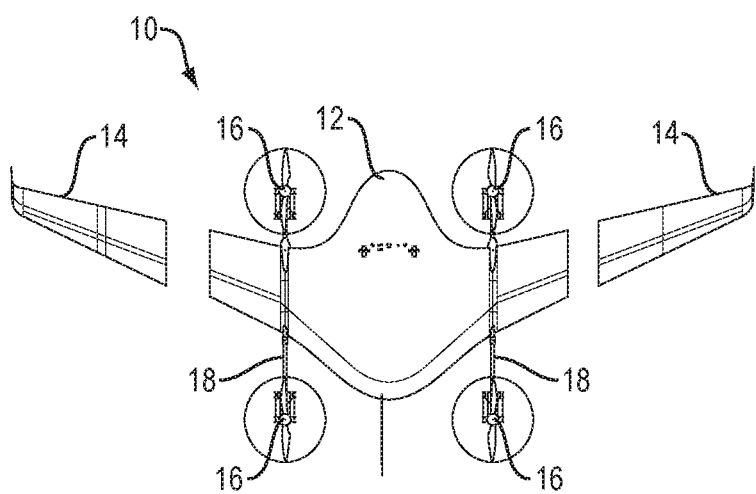
FIGS. 3-5 are views of the aircraft illustrating configurability.
Figure 4:
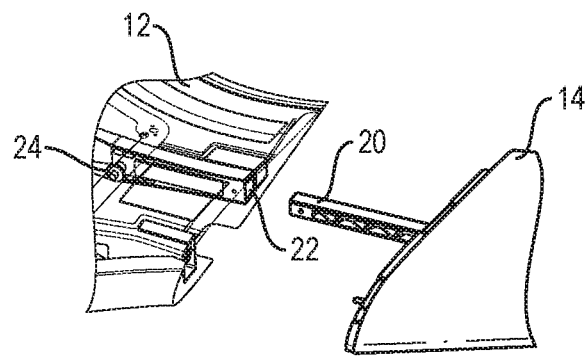
Figure 5:
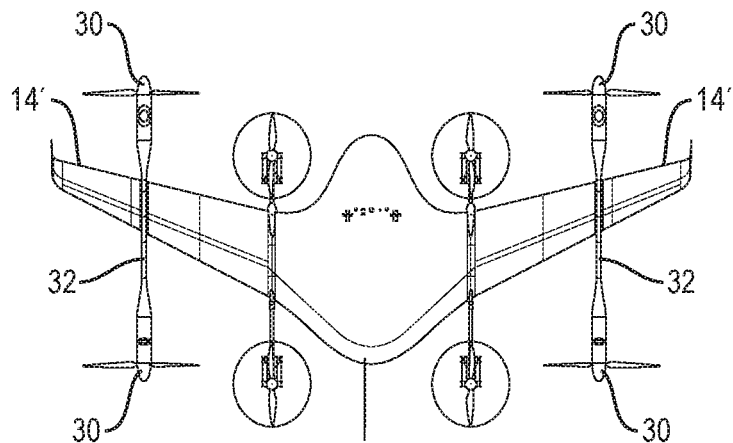

FIG. 3-5 illustrate configurability of the aircraft 10. FIG. 3 shows the aircraft 10 with the removable wing panels 14 separated from the central body 12. This is the above-mentioned rotorcraft configuration. Although the central body 12 does provide some lift in a horizontal airstream as mentioned above, the operation is essentially that of a rotorcraft, requiring significant upward thrust from the rotors to maintain altitude in horizontal flight.

FIG. 4 shows the attachment of a wing panel 14 to the central body 12. This is an example of a blind-mating interlocking spar arrangement, in which a spar 20 extends into a corresponding channel 22 of the body 12 and is retained by a quick-release pin 24 (which may be spring-loaded, for example).

FIG. 5 shows an alternative configuration in which additional rotors 30 are provided on additional booms 32 attached to the removable wing panels 14'. This configuration provides greater overall thrust and may be suitable for applications accordingly.

Figure 6:
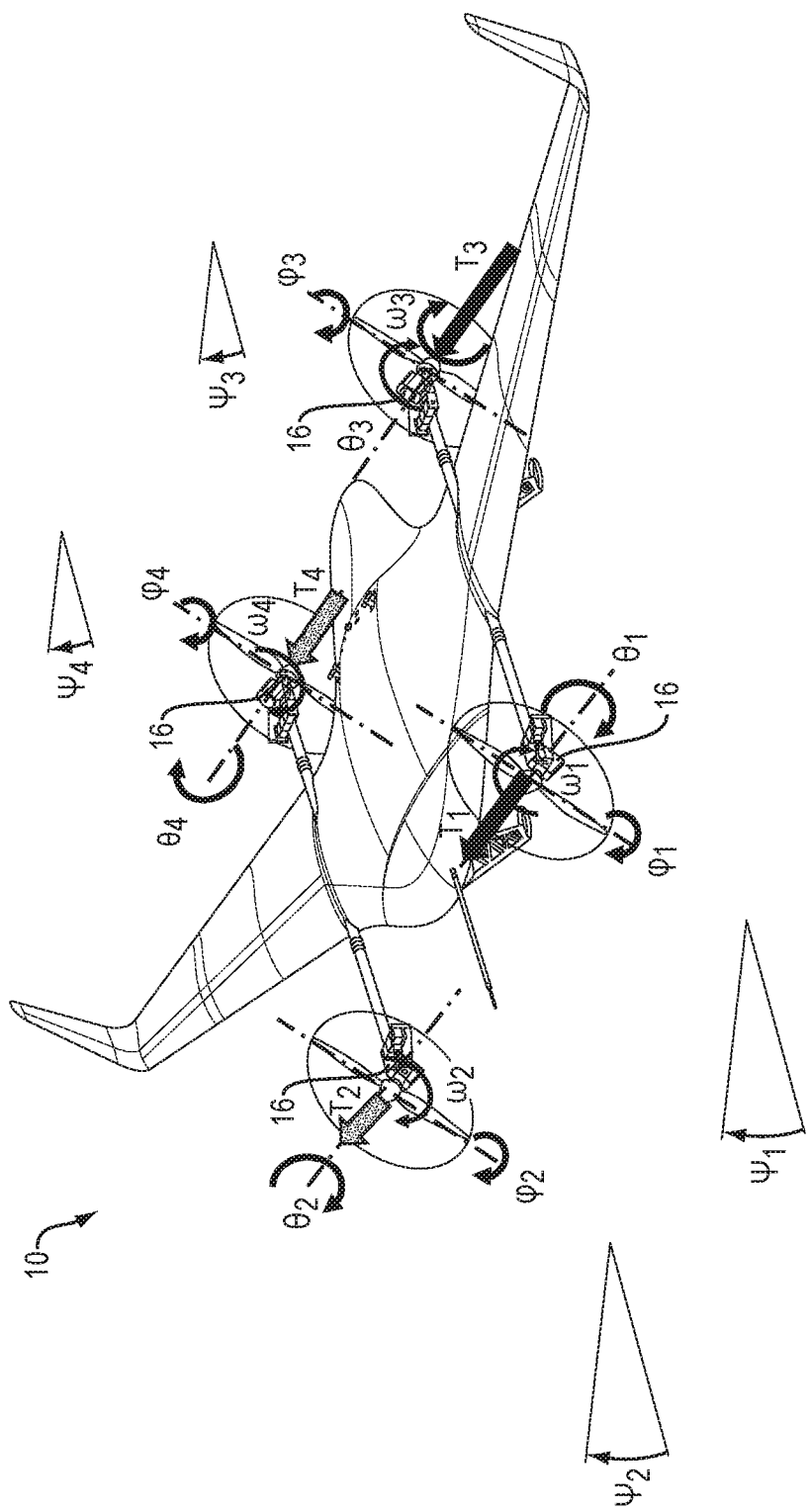
FIG. 6 is an isometric view of the aircraft illustrating thrust vectoring propulsion.

FIG. 6 illustrates the nature of thrust vectoring propulsion, with control in four dimensions—rotor assembly longitudinal tilt-angle $\theta$, rotor assembly lateral tilt-angle $\psi$, rotor RPM $\omega$, and rotor blade pitch $\varphi$. T indicates the resultant thrust vector. Numeric subscripts refer to the four separate rotors 16. In general, each of the rotors 16 may be independently controlled, although as described more below there may be configurations in which some of the rotor are either fixed or are constrained relative to others. All control dimensions for a rotor are independently actuated and controlled. Each rotor is independently controlled. The controller coordinates all control dimensions provided by the plurality of rotors to generate resultant aerodynamic effect for both vertical and fixed wing flight. This diagram assumes only single-axis tilt, but as also described more below, tilt may be provided in multiple axes, providing for even greater maneuverability.

Figure 7:
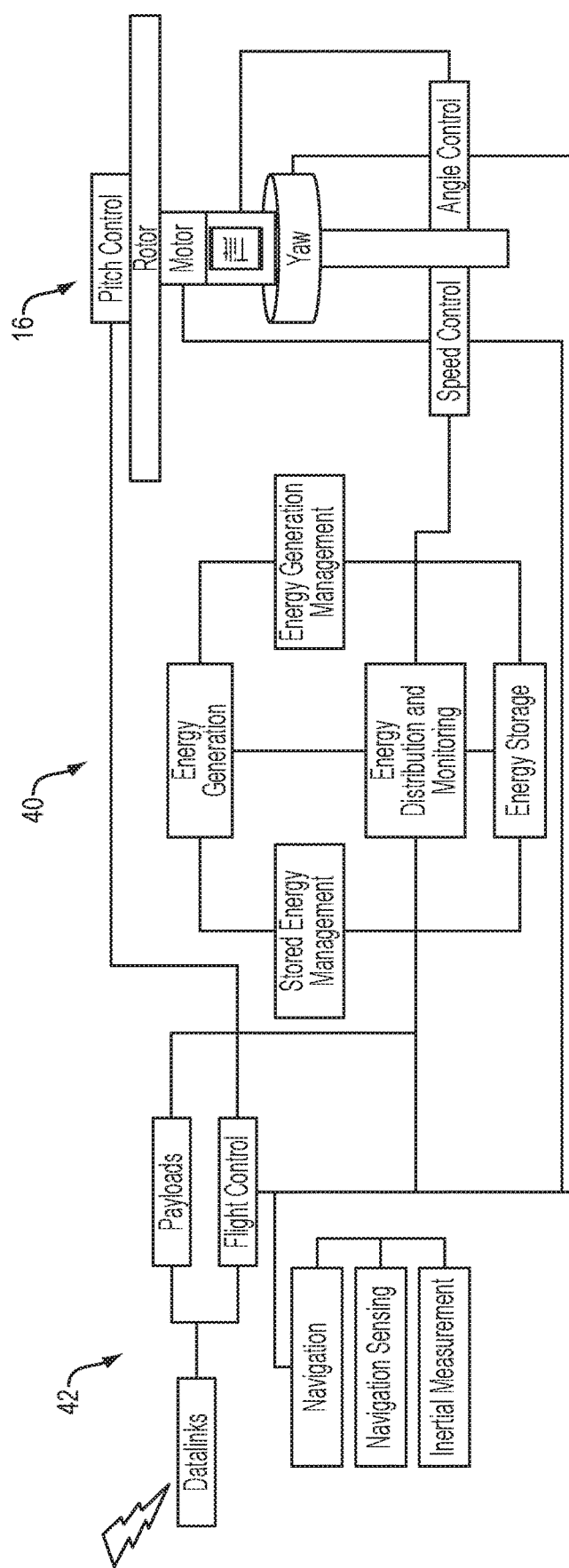
FIG. 7 is a block diagram of a flight control system.

FIG. 7 illustrates major components involved in flight control, including the following:

Energy-related components 40 including energy generation (e.g., solar panels), energy storage (e.g., batteries), energy distribution and monitoring, stored energy management, and energy generation management.

Navigation and related components 42 including datalinks for external communications, payloads, flight control, navigation, navigation sensing, and internal measurement.

Figure 8:
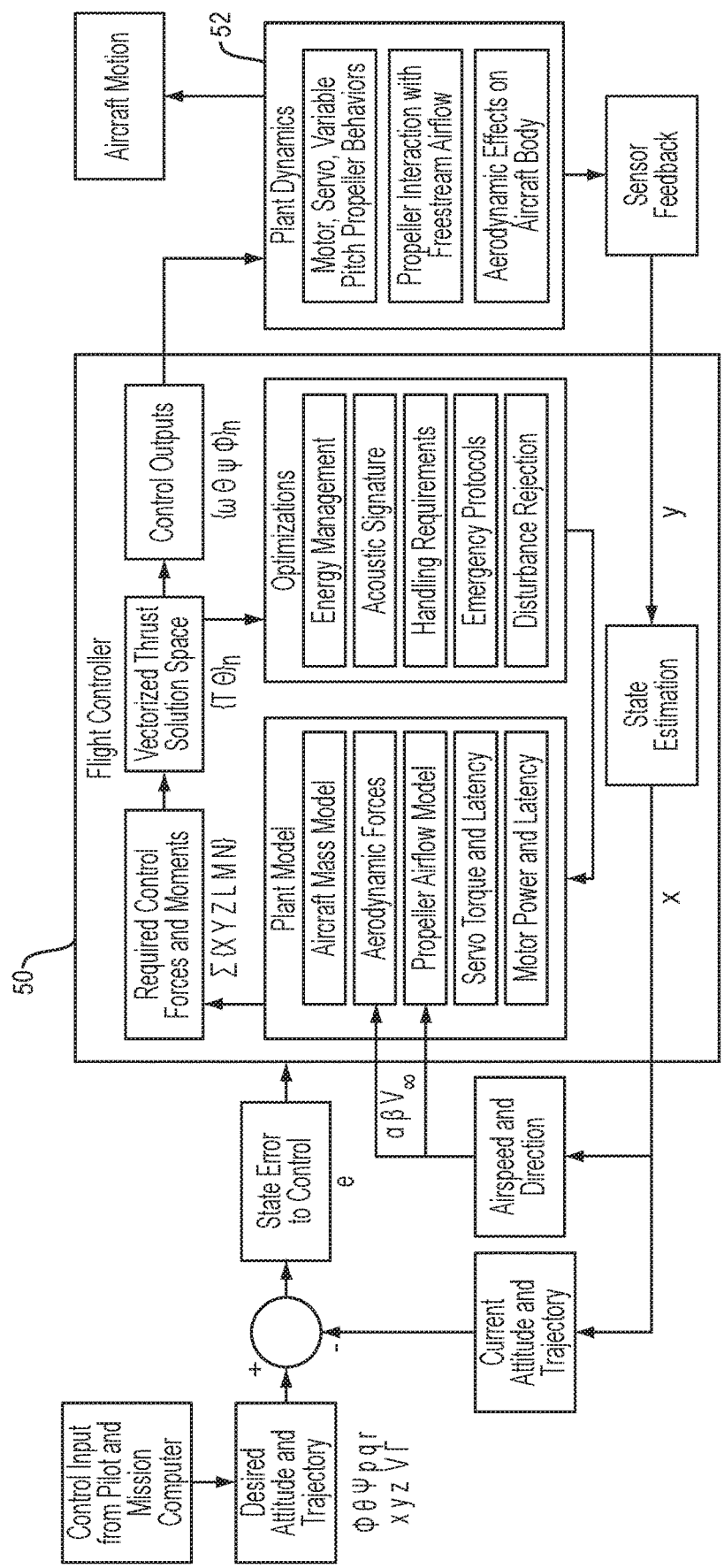
FIG. 8 is a block diagram of flight control at a detailed level.

FIG. 8 provides details of flight control as involving a computer-implemented flight controller 50 interacting with the plant dynamics 52 of the aircraft. The flight controller 50 generates control outputs including signals representing the values $\theta$, $\omega$, $\varphi$ and $\psi$ as mentioned above, which cause the physical aircraft 10 to interact with its environment accordingly. As shown the flight controller 50 may be realized as a model-based controller incorporating a model of the aircraft physical plant for predictive control. Sensed effects are provided to the controller 50 for state estimation and estimates of altitude and trajectory as well as airspeed and direction, which estimates are provided back to the flight controller 50 along with other inputs to update the control outputs. As mentioned, the control methodology is based on vectored thrust, in contrast to other aircraft that rely on control surfaces such as flaps, etc. The flight controller actuates all control signals independently to provide coordinated resultant propulsive force and control moments of the aircraft system for both vertical and fixed wing flight.

Figure 9:
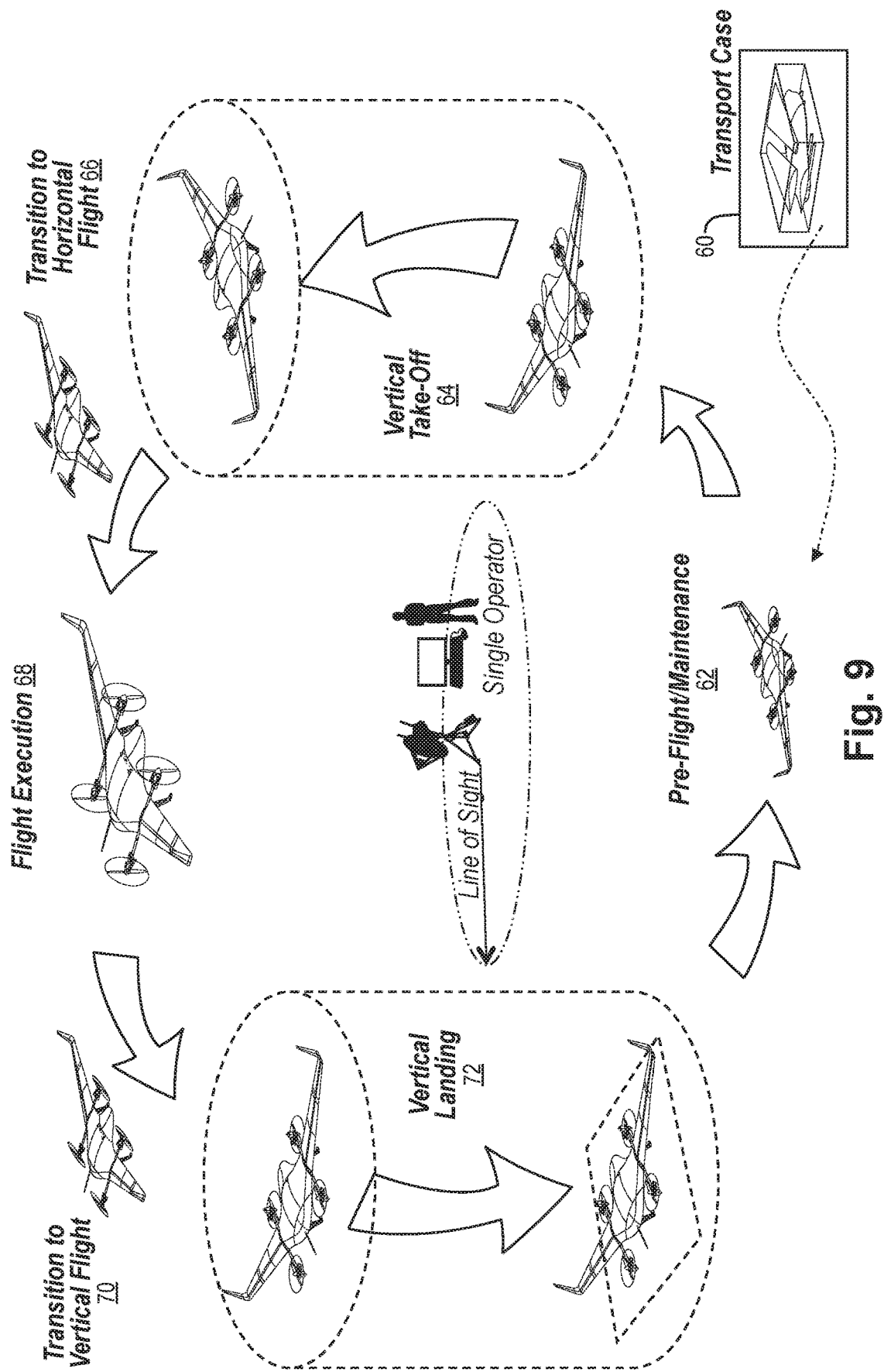
FIG. 9 is a schematic illustration of a concept of deployment of the aircraft.

FIG. 9 illustrates one concept of deployment of the aircraft 10, which is essentially that of a fixed-flight mission employing VTOL with attendant enhanced operational flexibility. Beginning with transport 60 and any pre-flight maintenance 62, operation proceeds to vertical take-off 64, transition to horizontal flight 66, flight execution 68, transition back to vertical flight 70, and vertical landing 72. This may be followed by post-flight maintenance, and then subsequent transport either for storage or a subsequent mission.

Figure 10:
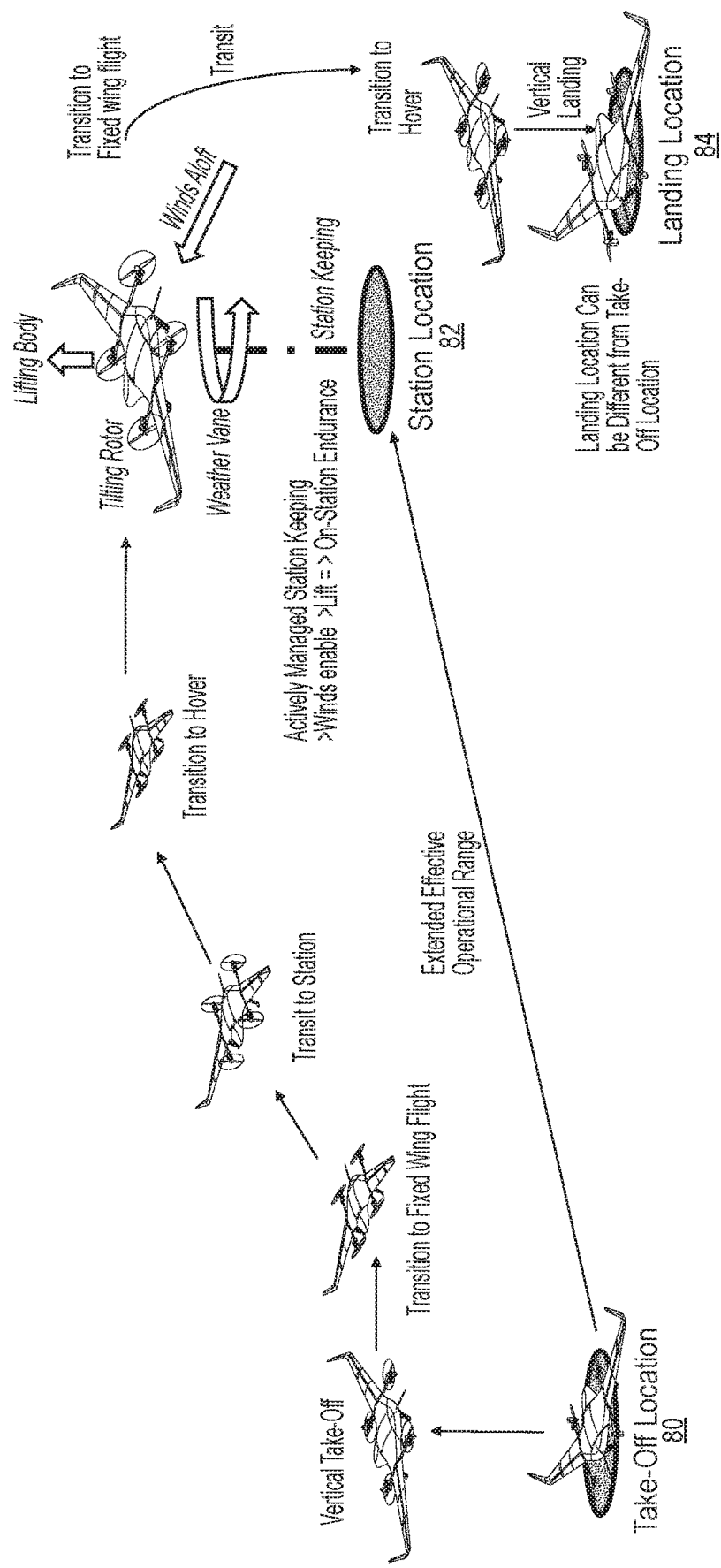
FIG. 10 is a schematic illustration of another concept of deployment of the aircraft.

FIG. 10 illustrates another concept of deployment of the aircraft 10, which is referred to as "station keeping"—a mission in which the aircraft 10 hovers for an extended period over a single location. Operation progresses from VTOL take-off from a take-off location 80, transition to fixed-wing flight and transit to station location 82, transition to hover or station keeping at the station location 82, then subsequent transition back to fixed-wing flight, transit to a landing location 84, and VTOL landing.

One advantage of the aircraft 10 is the ability of the wing-like central body 12 to provide lift in an airstream. The endurance of the aircraft in a station-keeping mission may be greater when deployed with winds aloft, in contrast to a conventional rotorcraft whose endurance generally decreases when deployed for station-keeping with winds aloft.

Figure 11:
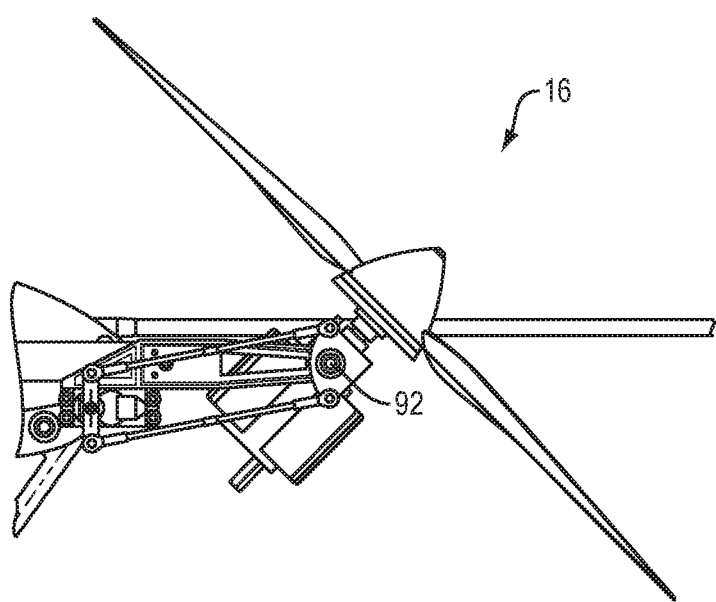
FIGS. 11-12 are illustration of rotors and their articulation.
Figure 12:
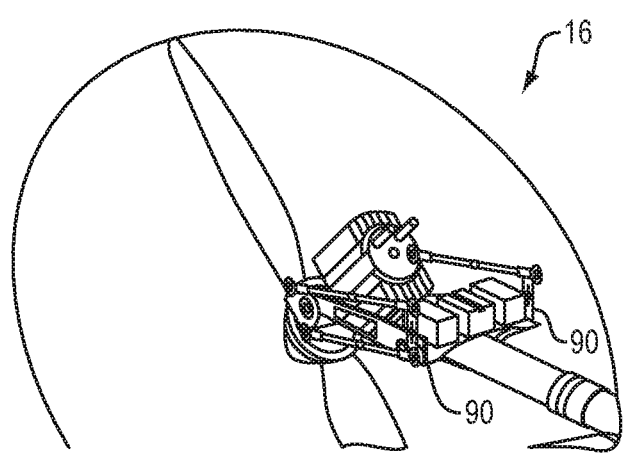

FIGS. 11-12 illustrate the rotors 16 and their articulation in additional detail. This arrangement employs parallel tandem servo control, i.e., two separate servo mechanisms 90 are arranged in parallel as best seen in FIG. 12. In this arrangement the axis of rotation 92 extends through the center of gravity of the rotor 16, as best seen in FIG. 11. Alternative mechanisms may be employed such as direct on-axis servo(s), series-tandem servos, non-center-of-gravity rotation, pneumatic or hydraulic mechanisms, belt- or gear-driven arrangements, etc. As noted above, variable positioning may be limited to one axis or may be multi-axis, e.g. tilt/yaw.

Figure 13:
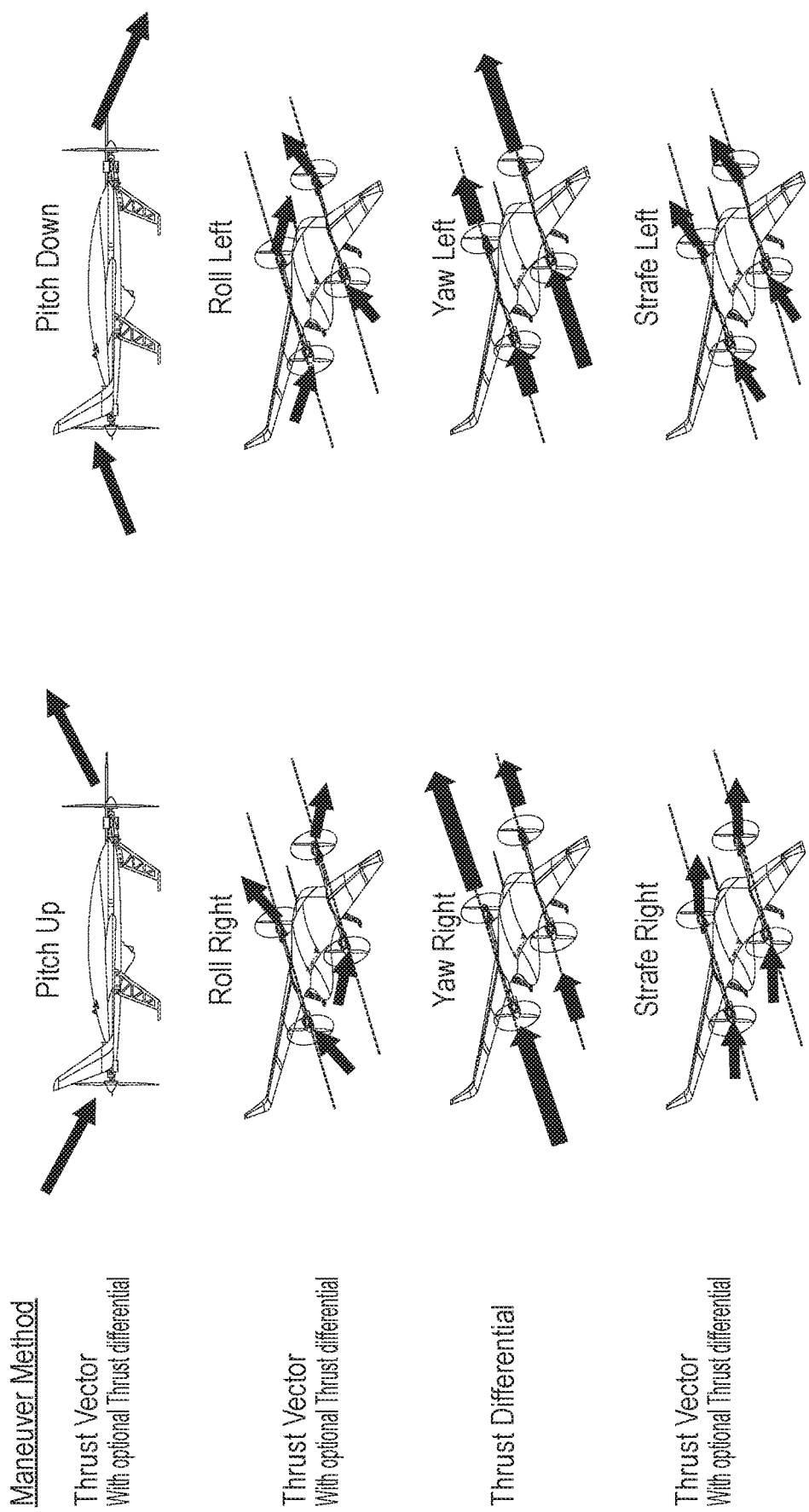
FIG. 13 is a quasi-schematic depiction of various forward-flight maneuvers employing thrust vectoring.

FIG. 13 illustrates various forward-flight maneuvers, all of which employ thrust vectoring except for the pure yaw movements (yaw right, yaw left) which can be performed using only thrust differentials (different thrusts applied to the rotors 16 on different sides of the aircraft). The required thrust vectors are shown schematically. Thus for pitching up, for example, the front rotors apply higher thrust upwardly while the rear rotors thrust downwardly.

Figure 14:
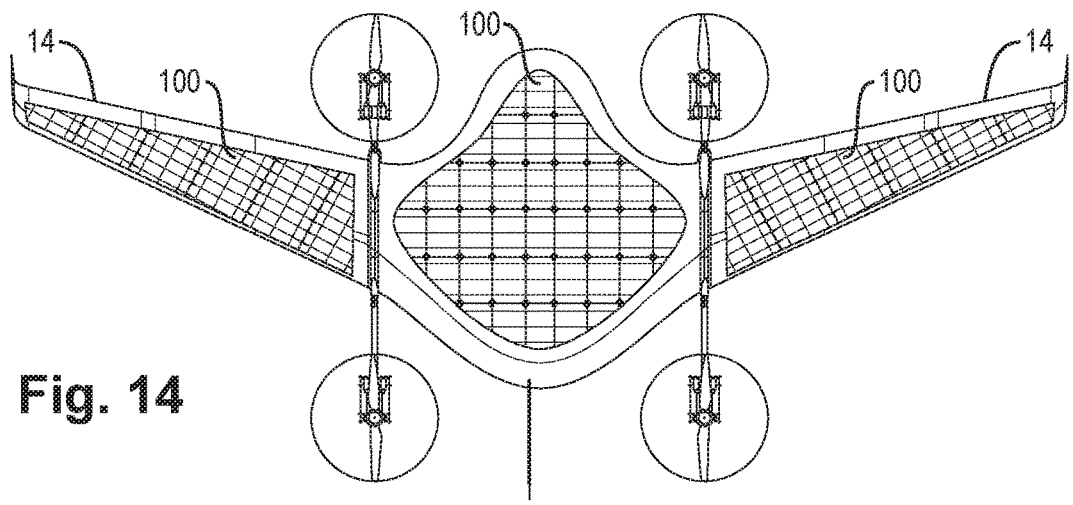
FIG. 14 is a top view of an aircraft employing photovoltaic solar panels.

FIG. 14 illustrates the use of photovoltaic solar panels 100 on the surface of the aircraft 100 for providing electrical power for operation. This approach leverages the aircraft surface area for collection potential. It may be possible to modularize the panels 100 on the wing panels 14. Internally, the aircraft 10 may employ other energy components including batteries and/or conversion technologies such as generators using internal combustion, Otto/diesel cycles, turbines (combustion gas or compressed gas), fuel cells (e.g., hydrogen or propane), or a constant energy source such as nuclear.

Figure 15:
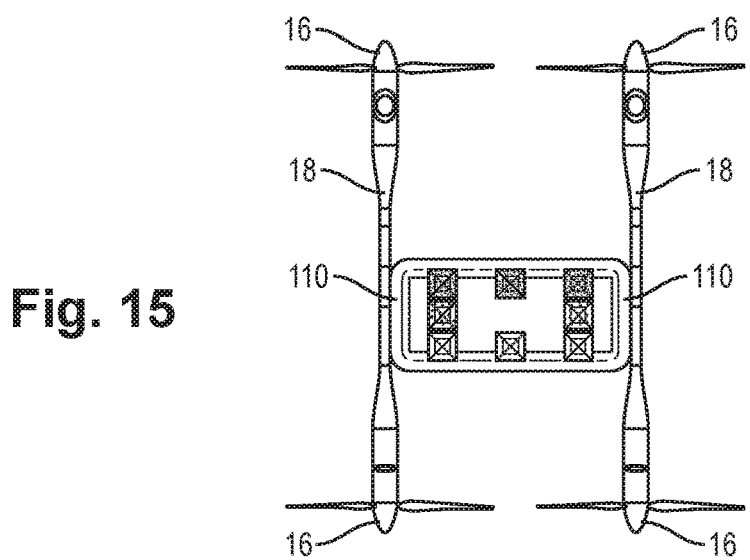
FIGS. 15 and 16 are schematic illustrations of modular components that may be used in connection with other airframe types.
Figure 16:
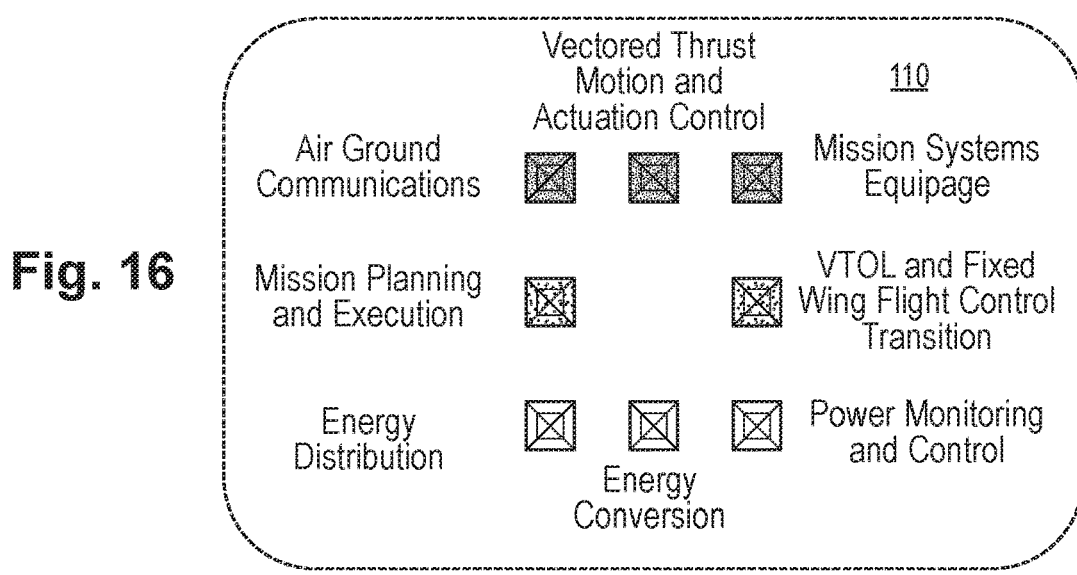

FIGS. 15 and 16 illustrate certain modularity of system components that can enable use of the general thrust-vectoring approach on a variety of different aircraft types as described more below. The propulsion system inclusive of the rotors 16 with associated actuators and components of the vectored thrust motion and actuation control system 110 (including energy storage, energy distribution, and other components as shown) can be adapted to other airframe types, including retrofitting of existing fixed wing systems.

Figure 17:
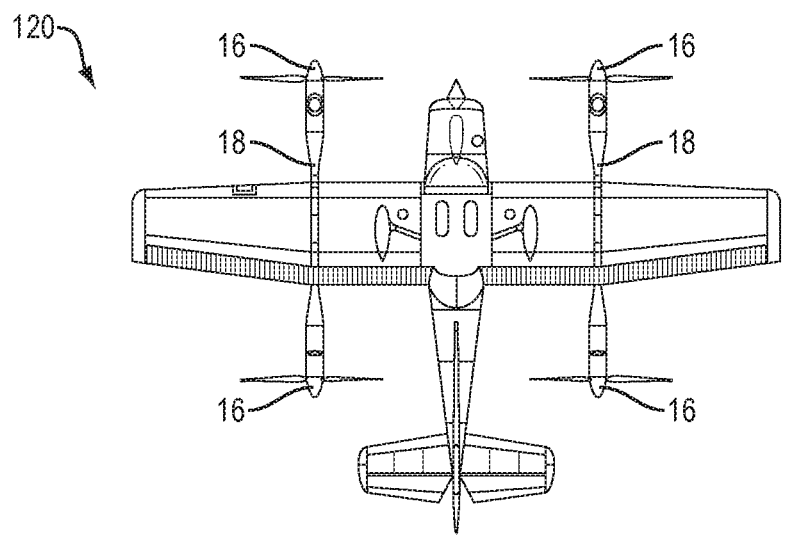
FIGS. 17-19 are top, front and side views respectively of a first aircraft of another airframe type employing the modular components.
Figure 18:
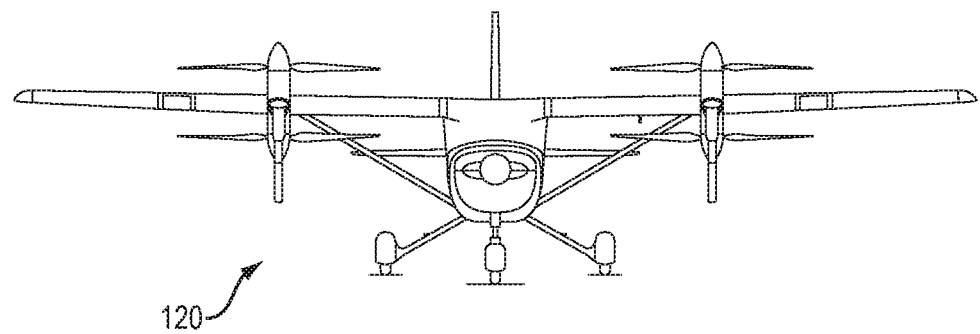
Figure 19:
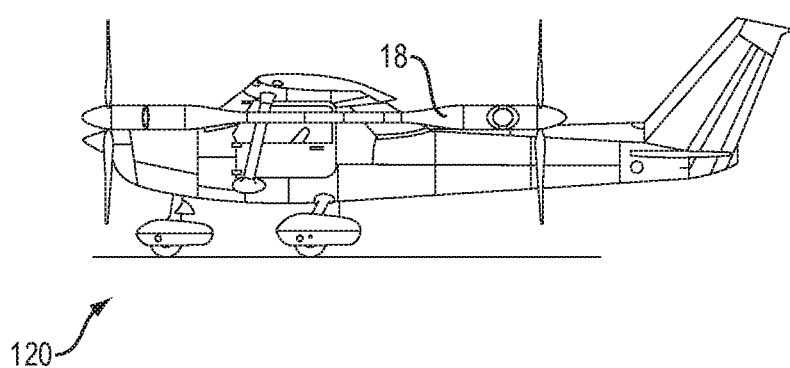
Figure 20:
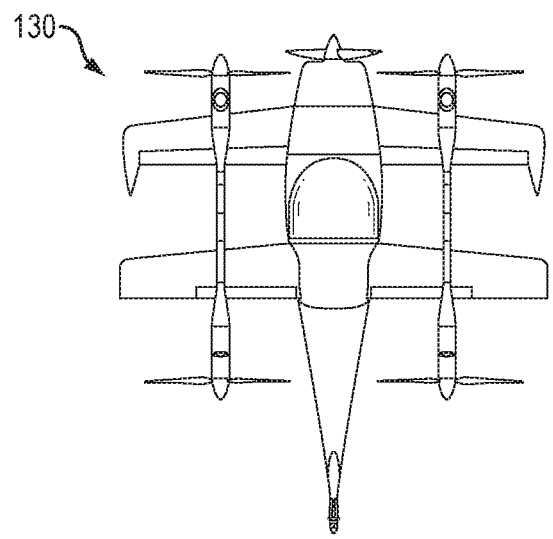
FIGS. 20-22 are top, front and side views respectively of a second aircraft of another airframe type employing the modular components.
Figure 21:
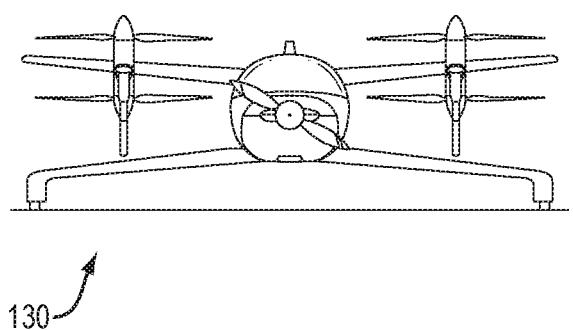
Figure 22:
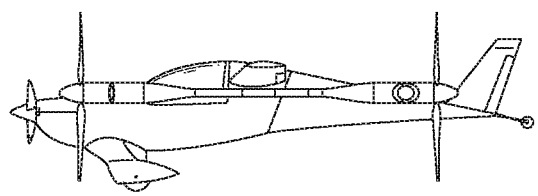

FIGS. 17-22 show examples of application to other airframe types. FIGS. 17-19 are top, front and side views of a conventional small fixed-wing airframe 120 of the type typically employing a single combustion engine, configured with rotors 16 and booms 18 attached to the undersides of the wings similar to the aircraft 10. FIGS. 20-22 are top, front and side views of a second type of fixed-wing aircraft 130 similarly configured with boom-mounted rotors 16.

Figure 23:
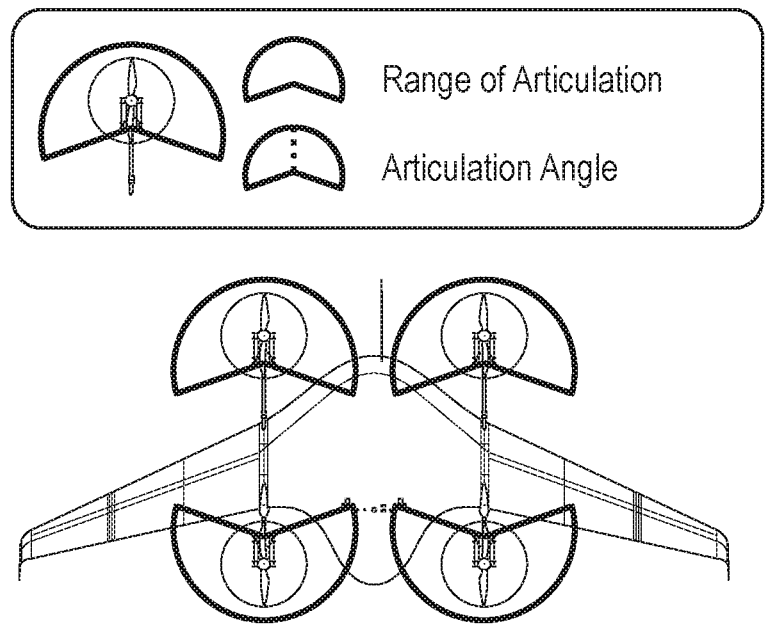
FIGS. 23-24 are quasi-schematic depictions (top view and side view respectively) of ranges of rotor articulation.
Figure 24:
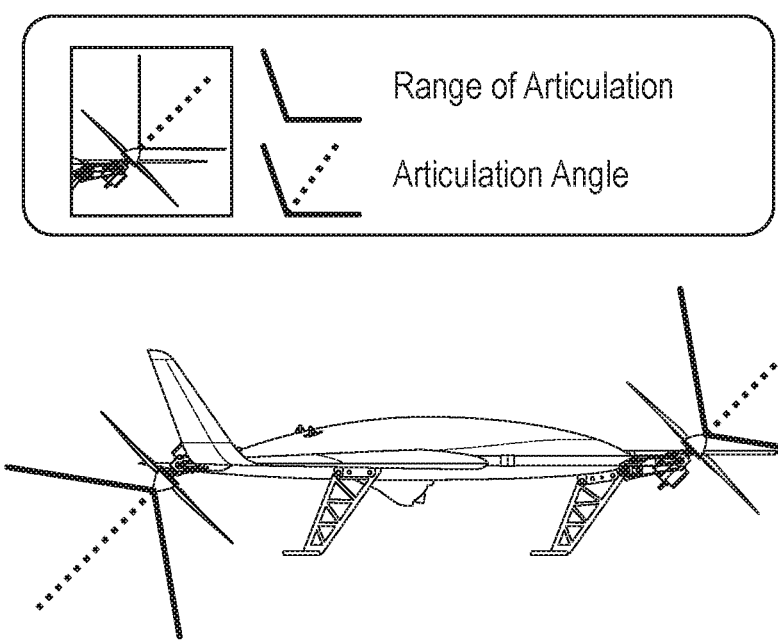

FIGS. 23-24 illustrate ranges of articulation (swept-arc shape) and example articulation angles (dashed line) of the rotors 16. In this example, FIG. 23 illustrates articulation about a generally vertical (yaw) axis, while FIG. 24 illustrates articulation about a generally horizontal (tilt) axis. Generally, the individual propulsion pods can have one or more degrees of freedom to rotate relative to the airframe/lifting surface/body. The axis of articulation can be decoupled or coupled to achieve a swept range of end effect motion.

Figure 25:
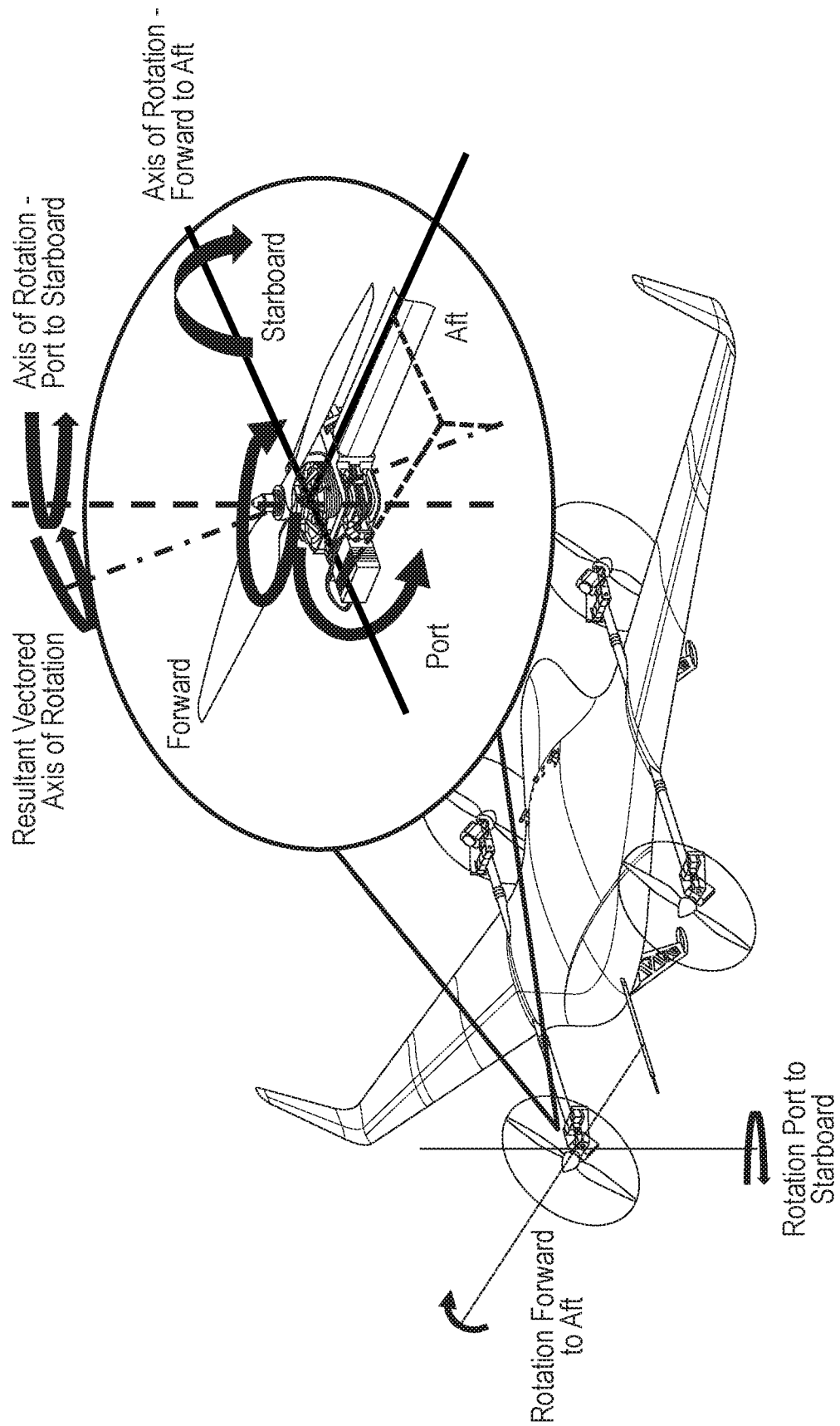
FIG. 25 is an isometric view showing detail regarding two-dimensional rotor articulation.

FIG. 25 shows additional detail regarding the two-dimensional articulation, with (1) rotation forward-to-aft (tilt) and (2) rotation port-to-starboard (yaw).

Figure 26:
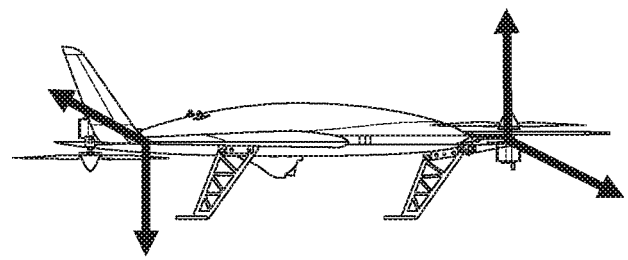
FIGS. 26-28 are side views of aircraft with different propulsion configurations.
Figure 27:
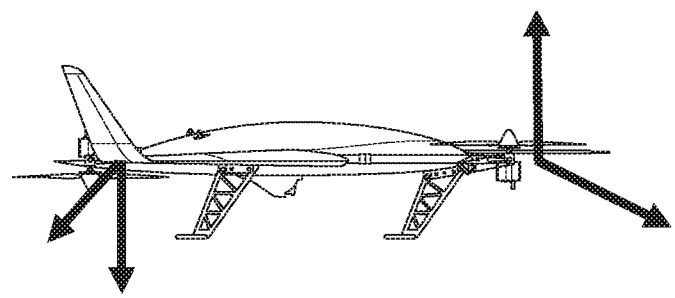
Figure 28:
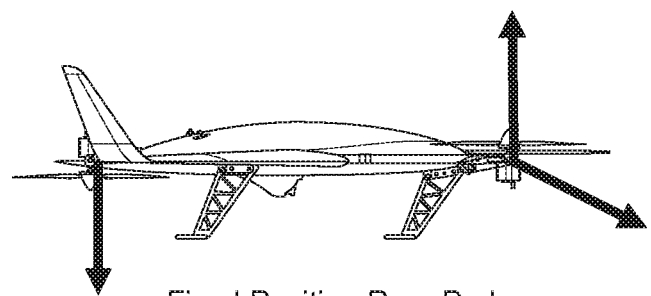

FIGS. 26-28 show examples of different propulsion configurations as briefly mentioned above. FIG. 26 is a symmetric configuration having variable position front pod (rotor) and variable position rear pod, where "position" refers to angular articulation such as shown in FIGS. 23-24. FIG. 27 is an asymmetric configuration having variable position front pod and semi-fixed (limited variability) position rear pod. FIG. 28 is another asymmetric configuration having variable position front pod and fixed position rear pod.

The following table describes functional details of the different configurations of FIGS. 26-28 in different phases of flight.

| Flight Phase | FIG. 26 Symmetric | FIG. 27 Constrained Set | FIG. 28 Fixed |
|---|---|---|---|
| VTOL/Hover | All rotors with similar range of articulation/motion | Rotors allocated to either full range of articulation or designated with limited actuation capability | Pair/set is affixed to the aircraft without articulation capability supporting VTOL in a traditional multi-rotor capacity. The remaining set/pair provides thrust vectoring capability through full range of articulation capability |
| Transition | All rotors active providing lift and transition assist | All rotors active with constrained set providing lift and transition assist. | All rotors active with fixed set/pair providing only lift assist. |
| Fixed Wing | All rotors active Option to stow pair/sets of rotors | Constrained pair/set is disabled/stowed. Option to activate with specific maneuver assist such as aggressive climb or evasive maneuvers. | Fixed pair/set disabled/stowed. |

For the symmetric arrangement of FIG. 26, all propulsion pods have equivalent ranges of motion and are used during all phases of flight. However, the system can operate with just a pair/set of propulsion systems operating to provide all flight control—with the remainder operating with limited or no thrust vectoring capabilities. In an embodiment having four rotors, this can be accomplished with either the forward pair of rotors or the rear pair of rotors. There may be a preference for the forward pair of rotors for fixed wing flight to achieve the most efficient propeller state during cruise; the rear motors can therefore be stowed in a defined position and rendered in active during fixed wing phases of flight yielding increased system electrical efficiency and reduced acoustic signature. The rear/aft rotors can then be reactive during fixed wing flight for greater dash speed or climb capability and to enter transition to VTOL for recovery at the conclusion of the flight. Moreover, this asymmetric control capability enables the system to employ rotor pair/set with restricted ranges of motion or with no tilting/yaw thrust vectoring capabilities to reduce weight and complexity of installed propulsion systems. For embodiments with more than 4 propulsion pods, the designation of alternative/restricted articulation capability can be applied between forward and aft propulsion systems so that a forward and rear set could have a mix of constrained/fixed propulsion pods and fully capable articulation capabilities. Selection of these alternative control modalities can be made by swapping and interchanging propulsion modules on the aircraft.

FIGS. 29-31 illustrate differences of flight control and dynamics among the three configurations of FIGS. 26-28 respectively. That is, FIG. 29 shows operation for an aircraft having the symmetric configuration of FIG. 26; FIG. 30 shows operation for an aircraft having the constrained configuration of FIG. 27; and FIG. 31 shows operation for an aircraft having the constrained fixed configuration of FIG. 28. All may realize a steep takeoff, but vary in the nature of their transition to forward flight, ranging from rapid transition (FIG. 29, for the symmetric configuration of FIG. 26) to mild transition (FIG. 30, for the constrained configuration of FIG. 27) to shallow transition (FIG. 31, for the fixed configuration of FIG. 28.

Figure 32:
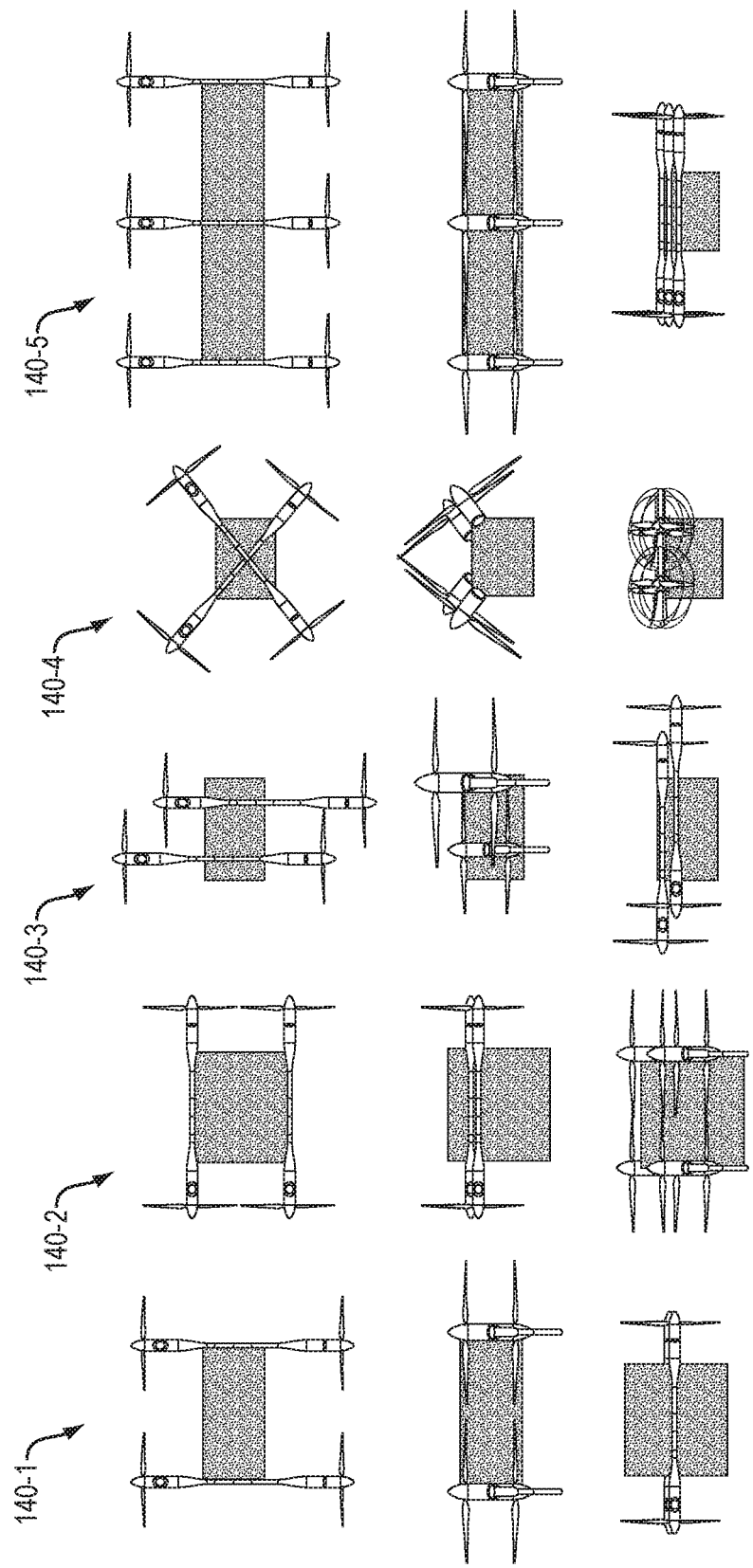
FIG. 32 is a quasi-schematic depiction of different propulsion pod geometries.

FIG. 32 is a quasi-schematic depiction of different propulsion pod geometries (configurations of boom-mounted rotors) that may be used. Five configurations 140-1 through 140-5 are shown. For each configuration 140, three views are shown: top, front and side (proceeding downward in FIG. 32). The different implementations of propulsion pod placement and attachment to the aircraft body include variations such as offsets and lateral supports.

Figure 33:
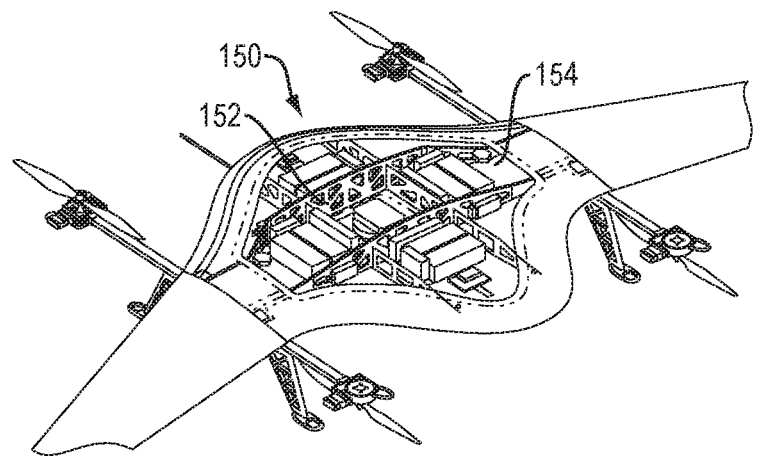
FIG. 33 is a view of an aircraft with exposed payload/battery compartment.
Figure 34:
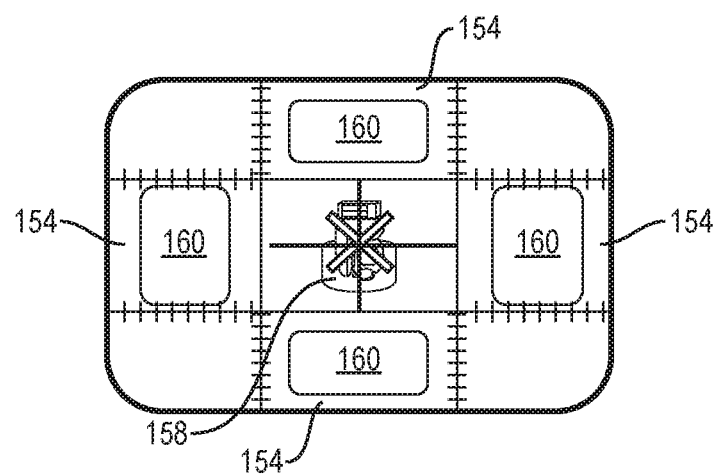
FIGS. 34-35 are schematic depictions of arrangements of payload and battery sections of the payload/battery compartment.
Figure 35:
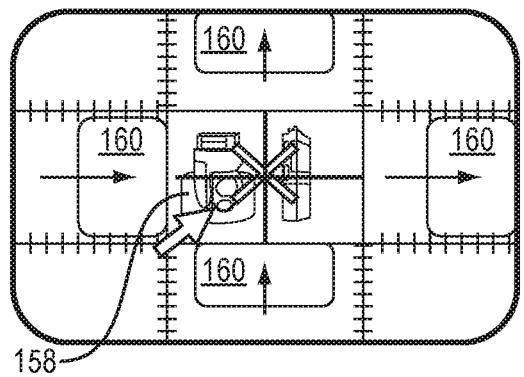

FIGS. 33-35 illustrate aspects of battery placement and dynamic positioning for managing the center of gravity of the aircraft. FIG. 33 shows the aircraft 10 having a compartment 150 within the central body 12. This compartment is divided into a central payload compartment 152 and four surrounding battery compartments 154. This internal layout includes variable battery installation stations that provide flexibility to manage the center of gravity (CG) of the aircraft in a deliberate and controlled manner without modification of the aircraft or other supporting systems. This is depicted in FIGS. 34 and 35. FIG. 34 shows a condition in which a payload 158 is CG-aligned and thus the batteries 160 are arranged symmetrically. FIG. 35 shows a different situation in which the payload 158 is not CG-aligned and thus the batteries 160 are positioned in an asymmetric manner to compensate, keeping the CG at the same centered location as in the situation of FIG. 34.

Figure 36:
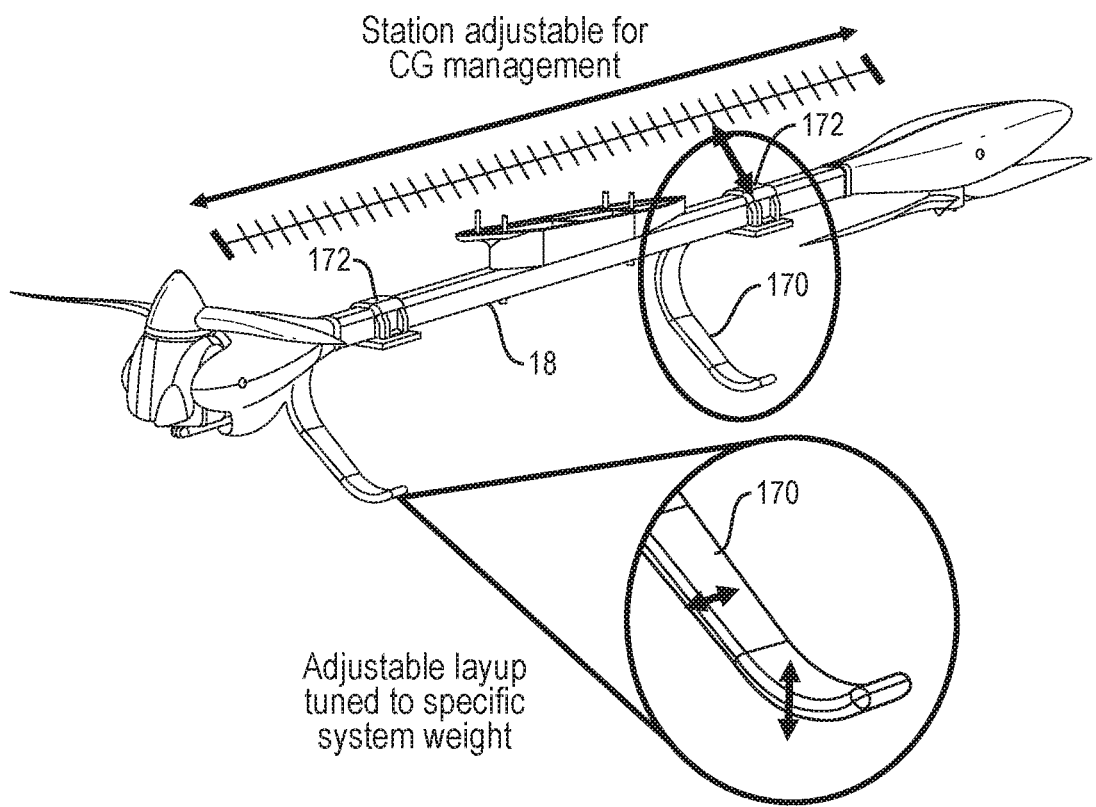
FIG. 36 is an isometric view of a boom with mounted landing gear.

FIG. 36 shows aspects landing gear design and attachment method. As shown, in one embodiment the landing gears 170 are attached to the boom 18, and their positions thereon may be station-adjustable (e.g. by use of sliding clamps 172) to achieve a desired center of gravity (CG). All landing gears 170 may be fabricated using from the same stock component and employ varying layup schedules for tuning based on the different aircraft weight and load cases. This enables the remainder of the aircraft to optimize structural mass fraction to increase payload/endurance capability while enabling for varying loadouts and configurations.

Figure 37:
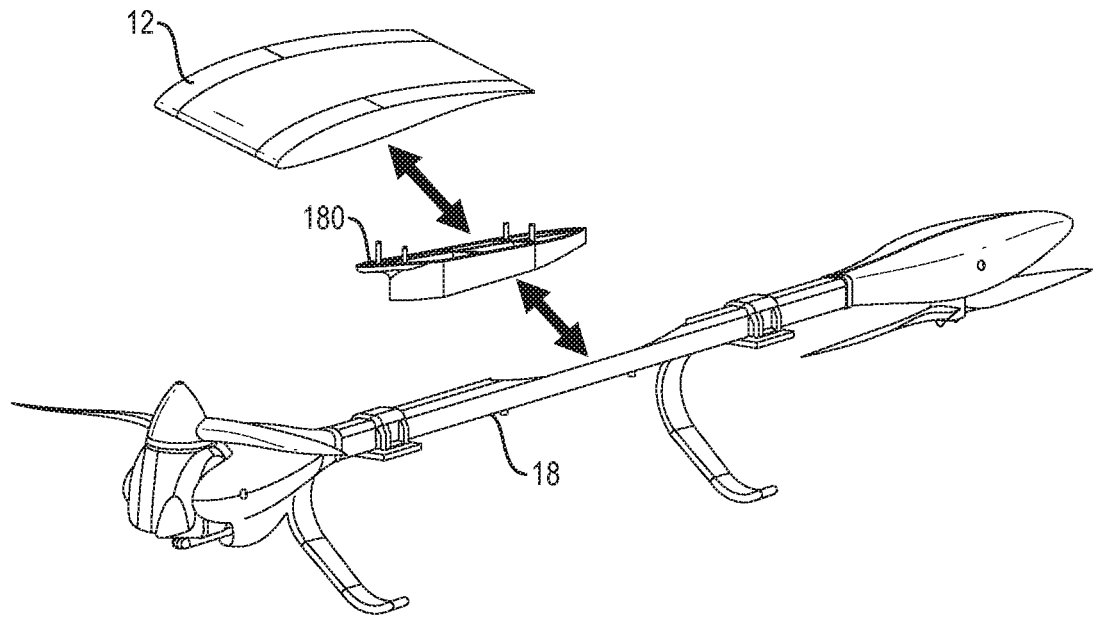
FIGS. 37-38 are isometric views illustrating modular attachment of a support boom to the aircraft.
Figure 38:
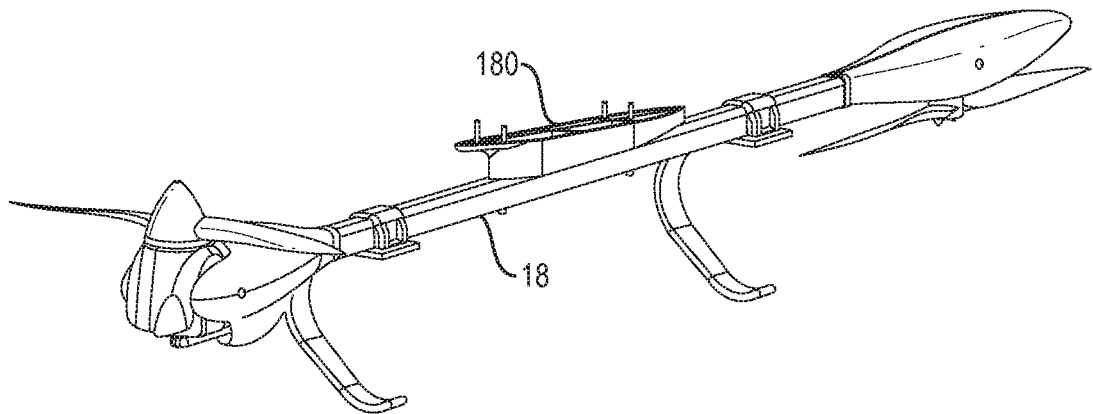

FIGS. 37-38 illustrate modular attachment of a support boom 18 to the aircraft. Each boom 18 modularly attaches to the underside lifting airframe, e.g., central body 12. An adjustable shim 180 is disposed between the bottom of the aircraft and the boom 18, enabling the propulsion system (boom-mounted rotors 16) to be aligned relative to the aircraft 10 to achieve desired thrust lines, angle-of-attack, and trim.

The following table presents additional information regarding the aircraft system.

| Feature | Discussion |
|---|---|
| Re-Configurable Aircraft Design - VTOL Capable fixed-wing aircraft that can operate as a multi-rotor | The disclosed system differs from known aircraft systems because it not only can transition between rotorcraft and fixed-wing flight, but also the wings can be removed, reducing form factor/wing span and facilitating operation in a hover mode while still retaining lifting body benefits (e.g., station keeping) |
| Maneuvering through independent propulsor vectors generated by unique control of each propulsor pod's relative thrust output and tilt angle | The aircraft does not utilize traditional control surfaces (ailerons, rudder, elevator, flaps) or rotorcraft control actuation (cyclic, collective pitch), instead using a single system of independently controlled propulsors providing lift, thrust, and flight control. |
| Thrust Vector Maneuverability: Tilting-hover | Vectored thrust capability enables the system to maintain aircraft pitch/elevation/angle of attack in all flight regimes. This includes enabling the system to control aircraft/payload pose during hover, and mitigates body rotation required for tilting translation. It also enables increased hover efficiency, since the system can align into the wind and mitigate head-wind forces in hover by tilting pods forward. When station-keeping, free-stream air (winds aloft) |

-continued

| Feature | Discussion |
| --- | --- |
| | may be utilized to provide assistive lift to reduce rotor hover power demands. This is a unique use case and implementation method for vectored thrust. |
| Thrust Vector Maneuverability: In-plane translation | Vectored thrust and flying wing design enable the system to translate without tilting like a traditional multi-rotor/quad-copter. Past a defined airspeed transition point, i.e., the stall speed of the airframe in forward flight, this enables the aircraft to transition to fixed-wing flight. |
| Thrust Vector Maneuverability: High rate yaw | Vectored thrust enables the aircraft to overcome differential torque yaw rate limitations characteristic of multi-rotor platforms. |
| Propulsor Tandem Servo tilting mechanism design | Tandem servo implementation provides redundancy and on-axis motor rotation minimizes torque required for high rate actuation |
| Integrated (passive) flight control surfaces on the tilting pods or airframe lifting body | Enables glide and trim capability. Enables imparted forces for aircraft maneuverability to supplement or augment primary thrust vectoring |
| Integrated variable pitch rotor mechanism/system | Variable pitch rotor actuation adds an additional degree of freedom for thrust vector control and operating between VTOL and forward flight that fixed pitch propellers cannot provide. |
| Mixing algorithms | In contrast to separated lift-thrust systems, the vectored thrust solution can use mixing schemes which solve for both the force balance of the aircraft as well as desired control parameters using only the main propulsors. |
| Hover efficiency/endurance from flying wing | The flying wing configuration provides a high lift-to-drag ratio (e.g., ~20:1) compared to traditional helicopters (4:1), tilt-rotors, or multi-rotor platforms. This increased lift while operating with winds aloft reduces electrical energy required to maintain altitude or climb while in hover. The flying wing platform provides greater lift with increasing airflow, and bridges the gap between non-lifting multi-rotors and fixed-wing aircraft that do not have VTOL ($<V_{stall}$) flight capability. |

While various embodiments of the invention have been particularly shown and described, it will be understood by those skilled in the art that various changes in form and details may be made therein without departing from the spirit and scope of the invention as defined by the appended claims.

What is claimed is:

1. An aircraft, comprising: an airframe having a fixed-wing section; a plurality of electric rotors attached to the airframe, the rotors being variable-position rotors having first and second operating configurations and transitions therebetween based on rotor position signals supplied thereto, the first operating configuration being a vertical-flight configuration in which the rotors collectively generate primarily vertical thrust for vertical flight of the aircraft, the second operating configuration being a horizontal-flight configuration in which the rotors collectively generate primarily horizontal thrust for horizontal fixed-wing flight; a source of electrical power for powering the electric rotors; and control circuitry configured and operative to independently control each of the rotors independent of the other rotors, including at least rotor thrust and rotor orientation of each of the rotors to provide for (i) the transitions between the first and second operating configurations during corresponding transitions between the vertical flight configuration and the fixed-wing horizontal flight configuration, and (ii) commanded thrust-vectoring maneuvering of the aircraft in both the vertical-flight configuration and the horizontal-flight configuration, w herein the rotors are configured for variable angular position about respective first axes parallel to a tilt axis of the aircraft, and w herein the rotors are further configured for variable angular position about respective second axes parallel to a yaw axis of the aircraft, a combination of the variable angular positions about the respective first and second axes providing a resultant rotor orientation having respective angular components about the respective first and second axes, w herein the airframe has a wing-like central body having the rotors disposed thereabout, and the fixed-wing section is constituted by removable wing panels attached to the central body, the aircraft being further configured in a rotorcraft configuration without the removable wing panels and utilizing greater upward thrust from the rotors to maintain altitude in horizontal flight than in the fixed-wing horizontal flight configuration, and wherein the wing panels and central body are co-configured with an interlocking spar arrangement for securing the wing panels to the central body, each wing panel having a respective spar extending into a corresponding channel of the central body and being retained by a corresponding quick-release pin.

2. The aircraft of claim 1, wherein the rotors include front rotors located forward of a center of the aircraft and rear rotors located rearward of the center of the aircraft, the front rotors having either an upward or downward orientation and the rear rotors having an opposite orientation to the orientation of the front rotors.

3. The aircraft of claim 2, wherein the front rotors have the upward orientation providing tractor propulsion and the rear rotors have the downward orientation providing pusher propulsion.

4. The aircraft of claim 1, wherein one or more of the rotors are further configured for variable pitch of respective rotor blades, and the control circuitry further provides control of the variable pitch of the rotor blades in the commanded maneuvering of the aircraft.

5. The aircraft of claim 1, wherein the rotors include respective servo control mechanisms for commanded positioning thereof.

6. The aircraft of claim 5, wherein the servo control mechanisms are parallel tandem servo mechanisms.

7. The aircraft of claim 1, wherein the rotors include constrained rotors having limited variable positioning more limited than a variable positioning of others of the rotors.

8. The aircraft of claim 1, wherein the rotors are mounted to respective ends of respective support booms, each support boom attached to a respective area of the airframe.

9. The aircraft of claim 8, wherein each support boom is attached to a central body of the airframe, the central body being configured to receive removable wing panels to constitute the fixed-wing section for fixed-wing flight with vertical take-off and landing.

10. The aircraft of claim 9, further comprising additional support booms with additional rotors mounted thereto, the additional support booms being attached to the removable wing panels.

11. The aircraft of claim 8, wherein the support booms extend in a fore/aft direction.

12. The aircraft of claim 8, wherein the support booms extend in off-axis directions not aligned with a fore/aft direction of the aircraft.

13. The aircraft of claim 12, wherein the support booms extend in a lateral direction perpendicular to the fore/aft direction of the aircraft.

14. The aircraft of claim 8, further comprising adjustable-position landing gears attached to the support booms.

15. The aircraft of claim 8, wherein each of the support booms is modularly attached to the airframe via an adjustable shim, the shim being adjusted to align the boom-mounted rotors relative to the aircraft to achieve desired thrust lines, angle-of-attack, and trim.

16. The aircraft of claim 1, wherein the central body includes a payload compartment surrounded by battery compartments configured for adjustable positioning of respective batteries to manage overall center of gravity of the aircraft.

17. The aircraft of claim 1, wherein each of the rotors is a respective rotor assembly having a propeller and an electric motor configured to rotate the propeller in operation.

18. The aircraft of claim 1, wherein the independent control of the rotors about the respective first and second axes includes control providing for pitch, roll, and yaw movements of the aircraft.

* * * * *